United States Patent [19]

Kotzsch et al.

[11] 4,044,109

[45] Aug. 23, 1977

[54] PROCESS FOR THE HYDROCHLORINATION OF ELEMENTAL SILICON

[75] Inventors: Han-Joachim Kötzsch, Rheinfelden; Hans-Joachim Vahlensieck, Wehr, Baden; Walter Josten, Rheinfelden, all of Germany

[73] Assignee: Dynamit Nobel Aktiengesellschaft, Troisdorf, Germany

[21] Appl. No.: 533,740

[22] Filed: Dec. 17, 1974

[30] Foreign Application Priority Data

Dec. 31, 1973 Germany .............................. 2365273

[51] Int. Cl.² ........................................... C01B 33/08
[52] U.S. Cl. ..................................... 423/342; 423/341
[58] Field of Search ....................... 423/341, 342, 491

[56] References Cited

U.S. PATENT DOCUMENTS 3,148,035    9/1964    Enk ........................................ 423/342

FOREIGN PATENT DOCUMENTS 1,048,892    1/1959    Germany

*Primary Examiner*—L. Dewayne Rutledge Rutledge
*Assistant Examiner*—Michael L. Lewis
*Attorney, Agent, or Firm*—Burgess, Dinklage & Sprung

[57] ABSTRACT

An improvement in a process for preparing silicon tetrachloride or silicon trichloride wherein elemental silicon is contacted with hydrogen chloride in a fluidized bed, the improvement residing in carrying out the process in the presence of an iron compound, which iron compound is present in an amount such that when calculated as iron, the iron content is 10 to 43 weight percent based on the weight of the total solids in the fluidized bed, at a temperature in the range of 260°–600° C, preferably in the absence of an inert gas.

9 Claims, No Drawings

PROCESS FOR THE HYDROCHLORINATION OF ELEMENTAL SILICON

BACKGROUND OF THE INVENTION

Field of the Invention

This invention relates to preparation of silicon trichloride or silicon tetrachloride and to a gaseous mixture thereof. This invention is particularly directed to a process for preparing silicon trichloride and/or silicon tetrachloride by a process in which temperature control of the reactants is provided whereby to obtain desired product. This invention is particularly directed to a process for the preparation of silicon trichloride and to minimizing the amount of silicon tetrachloride produced as by-product in such synthesis. This invention is directed to a fluidized bed process for the preparation of silicon tetrachloride or silicon trichloride.

The hydrochlorination of elemental silicon takes place at temperatures above 260° C, two reactions mainly taking place:

1. Hydrochlorination to trichlorosilane, and 2. Hydrochlorination to tetrachlorosilane, in accordance with the following equations:

In temperature ranges below about 400° C it is principally Reaction 1 that takes place, i.e., it is mainly trichlorosilane that forms. At higher temperatures, Reaction 2 is increasingly favored, i.e., the tetrachlorosilane formation increases with the temperature.

As the temperature rises from 260° toward 400° C, the trichlorosilane content diminishes from approximately 90% at 260° C to approximately 40% at 400° C. As the temperature increases from 400° to 500° C, the trichlorosilane content further diminishes from 40% at 400° C to about 10% at 500° C. At temperatures above about 500° C, the $SiCl_4:HSiCl_3$ ratio remains constant at approximately 9:1.

Both of the reactions set forth above take place rapidly and are highly exothermic. The reaction system heats up locally and spontaneously to more than 1000° C. As this occurs, the trichlorosilane content reduces to about 10% or less, while the tetrachlorosilane content amounts to 90% or more.

Unfortunately, of these two products the product of increasing technical and economic importance is the trichlorosilane. This is owing to the fact that trichlorosilane is useful in the semi-conductor field, for example, and is also useful as a basic substance in organosilane chemistry. Hence, it has become necessary to provide means to steer the hydrochlorination reaction of elemental silicon mainly towards the formation of trichlorosilane. Obviously, a prerequisite for this is to control the heat generated during the reaction so as to maintain a low reaction temperature, i.e., a temperature in the range of 260° to 400° C. If means are not provided to control this reaction, unfavorable low quantities of trichlorosilane are provided, this material being further converted in the process to tetrachlorosilane owing to the increasing reaction temperatures that prevail. It is not possible during this process to shift the temperature dependence to a higher temperature level by providing a higher hydrogen partial pressure.

Attempts have heretofore been made both in the solid bed and in the fluidized bed to commence the reaction at the lowest possible temperatures by introducing a catalyst, such as a copper catalyst, for example, and to retard the reaction such that lower temperatures are established and heat removal becomes possible. These efforts, however, have not as yet attained the desired success. The addition of metal catalysts does facilitate the reaction start-up at temperatures below 280° C, but such expedient is not capable of preventing spontaneous heating up in the reaction bed to white-hot temperatures in excess of 500° C. In the solid bed, either with or without a catalyst, an incandescent zone is immediately formed in which the reaction is directed toward tetrachlorosilane in accordance with equation 2 set forth above. The tetrachlorosilane is favored because the excess heat of reaction cannot be carried away rapidly enough. Even in the fluidized bed, with the rapid temperature control which is characteristic of this type of operation, the removal of heat is unsuccessful. Instead, the fluidized bed heats up locally on the bottom to a white heat so that even when the above-named conditions are produced in the fluidized bed, the tetrachlorosilane material predominates in the final product. In addition, these extreme process conditions necessitate great expense for repairs because they are extremely subject to trouble especially on account of the corrosion problems which occur employing hydrogen chloride at the elevated temperatures which are provided owing to the exothermic nature of the reaction and the inability to withdraw heat from the reaction zone.

Attempts have heretofore been made to remove the considerable local overheating that develops during this reaction, for example by feeding inert gases into the bed. For this purpose, experiments have been performed both with hydrogen and with nitrogen, as inert gases, in conjunction with gaseous tetrachlorosilane, the inert gas being mixed with the hydrogen chloride provided for the reaction and the hydrochlorination reaction being performed in a fluidized bed containing elemental silicon as the solid phase. In this manner, it was possible to produce the desired range of temperatures, but this mode of operation is disadvantageous in fluidized bed procedures especially because, due to the intense self-heating of the reaction, the inert gases have to be supplied in such large quantities. This results in an incomplete reaction of the hydrogen chloride since the inert gases in the fluidized bed tend to bubble and splash within the reaction zone and to effect intensive mixing as the reactants pass through the reaction zone during the established detention period. This high inert gas content coupled with the presence of large quantities of unreacted hydrogen chloride also results in considerable material losses owing to the removal of granular silicon solids from the fluidized bed. This, in turn, creates additional difficulties in the form of requiring a constant shifting of the lines through which the reactant and product streams pass and requiring cleaning of these lines and the reactor. The presence of such large quantities of hydrogen chloride tends to effect corrosion of the lines and reaction vessels employed to a substantially greater extent than would be provided if less unreacted hydrogen chloride were present in the product streams.

Lastly, the inert gas content carries away large amounts of trichlorosilane into the exhaust gas on account of its high partial pressure which is approximately 400 Torr at 15° C and 30 Torr at −40° C. This requires an expensive washing and distillation system for the recovery of the trichlorosilane, an obvious disadvantage.

It therefore became desirable to provide a process for the production of trichlorosilane by reaction of elemental silicon and HCl which was not characterized by local overheating of the reaction mixture, which could be carried out at a temperature of 260° to 400° C, which did not require the introduction of inert gas solids, which was not characterized by high quantities of unreacted hydrogen chloride in the product streams and which did not require expensive washing and distillation systems for the recovery of trichlorosilane.

SUMMARY OF THE INVENTION

The objects of this invention are provided in a process for preparing silicon tetrachloride or silicon trichloride wherein elemental silicon is contacted with hydrogen chloride in a fluidized bed, the process being characterized in that it is carried out in the presence of an iron compound, which iron compound is present in an amount, such that when calculated as iron, the iron content is 10 to 43 weight percent based on the weight of the total solids in the fluidized bed, the reaction being carried out at a temperature in the range of 260°–600° C.

In accordance with the present invention, it has been found that if an iron compound is employed in the fluidized bed stream, control of the reaction temperature can be provided to + or − 5° C of the desired temperature. Generally speaking, the iron compound is present such that, when calculated as iron, it amounts to 10–43 weight percent of the total solids in the fluidized bed. By use of an iron compound, either Reaction 1 or 2 set forth above can be conducted with maximum selectivity. Thus, maximum control of the reaction is permitted whereby trichlorosilane can be recovered as the predominating halosilicon compound. The method of the invention permits a reliable removal of heat by carrying the heat away in a known manner through heat exchangers so that any desired temperature of reaction can be established between about 260° C and about 600° C.

Hydrochlorination of elemental silicon is directed by the selection of the reaction temperatures not only directly to a yield of approximately 90% trichlorosilane, but also to any desired ratio of admixture of trichlorosilane with tetrachlorosilane between about 10 and 90% in the reaction product.

This special feature of the method of the invention additionally offers the advantage that the synthesis can be adapted to the prevailing need for trichlorosilane and tetrachlorosilane. The percentage composition of the crude product depends almost exclusively on the reaction temperature utilized, which is provided by the temperatures established in the reactor before the commencement of the reaction. It is considered quite suprising that the iron concentration in the fluidized bed would control the reaction temperature to the extent found, whereby any desired quantity of trichlorosilane can be provided by elemental silicon hydrochlorination.

The isolation of the products is accomplished in a known manner by condensation and quenching, for example with hexachlorodisiloxane at −30° C. The refinement is performed by conventional distillation methods.

DESCRIPTION OF SPECIFIC EMBODIMENTS

One particular advantage of the process resides in that, with regard to the crude substance balance, there is a complete absorption and reaction of the hydrogen chloride charged. The product which results is virtually dust-free as it emerges from the smoothly flowing fluidized bed. This dust-free operation is owing to the fact that virtually complete reaction of the silicon granules in the fluidized bed is assured. These two factors also fulfill important requirements for trouble-free reliable industrial operations. These two factors are as follows:

1. Complete hydrogen chloride absorption resulting in a uniform fluidized bed operation free of bubbling and splashing which facilitates the isolation of the crude products; and 2. Reduction of corrosion in the reaction vessels and lines employed.

The virtually dust-free crude reaction product obtained no longer causes uncontrollable disturbances in the lines employed for the process, which lines have heretofore been extremely sensitive to fluidized bed synthesis of tri- and tetrachlorosilane by reaction of HCl and elemental silicon. Since the reaction avoids the production of high reaction temperatures, the amount of corrosion in the lines owing to the presence of unreacted HCl at such high temperatures is markedly decreased. Since no corrosion occurs, substantially no changes occur in flow rates of products through these lines which would otherwise occur due to pressure fluctuations in the lines owing to corrosion therein.

These decisive improvements of the process, plus the precise removal of heat from the center of the reaction, are the important advantages of the method of the invention, which results in a reliable control of the hydrochlorination reaction of elemental silicon. This achievement is surprisingly accomplished by the introduction of iron compounds, in accordance with the invention, into the fluid bed serving as the reaction zone. Iron concentrations of 10 to 43%, and preferably 16 to 36%, are used according to the invention. Iron(II) chloride is used as the preferred iron compound.

The iron compounds are in the form of a finely divided powder with grain sizes less than 0.1 mm, with no minimum particle size required. A variety of methods of feeding are used:

1. Water free iron(II) chloride is ground and mixed into the silicon fluid bed before the beginning of the reaction.

2. The iron concentration of the invention is prepared prior to the beginning of the operation by reacting inorganic or organic iron-containing material, such as ferrosilicon for example, with hydrogen chloride in the fluid bed itself. This procedure presents no difficulty to the average person skilled in the art and offers the advantage that ferrosilicon types with an iron content greater than 6% can be used, e.g., 0 to 40% by weight iron.

Other iron compounds which can be used include: FeO, $Fe_2O_3$, $Fe_3O_4$, $FeSO_4$, Fe-oxalate, Fe-acetate, Fe-acetyl-acetonate.

Aside from the use of the iron containing material, the process of the invention is conducted by the methods commonly used in fluidized bed operations. A fluidized bed containing iron in accordance with the invention is used, into which the elemental silicon is fed continuously or discontinuously as it is consumed, in grain sizes between 0 and 2 mm, preferably between 0.04 and 1 mm, the depth of the fluidized bed being variable, preferably between 200 and 600 mm. Hydrogen chloride is fed into the bottom of the fluidized bed such that a flow velocity of 1 to 8 cm/sec and preferably 2 to 6 cm/sec prevails at the bottom of the bed, representing a vapor hourly space velocity (VHSV) of 3.5 to 29, preferably 7 to 21.5 Ne/cm²h.

The selection of the controlled temperature between about 260° C and about 600° C is effected by means of thermostatic control through heat exchange means of conventional construction disposed in or on the reactor.

Suitable raw materials are the qualtities of technical pure silicon and ferrosilicon which are obtainable commercially. If technical pure silicon (99% Si) is used, the reactor operates over longer periods without appreciable accumulations of non-volatile substances such as slags of various origin and quartz said for example, originating from impurities in the technical pure silicon. If silicon qualities containing large amounts of foreign matter such as iron or aluminum, for example, are used, one must, of course, provide for the maintenance of the claimed iron concentration in the fluid bed and, if necessary, for the special treatment of any foreign products in the product gas, such as for example higher boiling or subliming substances, using known methods for the purpose.

If, for example, the iron concentration used in accordance with the process described herein is exceeded due to enrichment caused by the constant, continuous feeding of ferrosilicon as the raw material, sufficient waste can in some cases be let out of the fluid bed from time to time to enable the iron concentration to be kept at a constant level. After regeneration, for example by washing out the iron(II) chloride with a little ethanol or by sublimation at about 600° C in a current of hydrogen gas, the silicon content of the waste can be recycled into the process.

The process can be performed in continuous apparatus of a great variety of sizes. Advantageously, due to the advantages attained with the process of the invention (corrosion decrease), the apparatuses required for the process, such as reactors, heat exchangers, condensers, pipelines, etc., can be manufactured in an entirely conventional design. In addition to ceramic material, such as for example glass, quartz, porcelain, chamotte, vitreous enamel, etc., metals such as, for example, steel and cast iron, which in the former processes could be used only to a limited extent, can in the present case be used without limitation on account of the drastic reduction of the corrosiveness by the process of the invention. Consequently, expensive exotic materials and special construction are unnecessary in the building of the apparatus. Even the cost of repairs is appreciably reduced because any necessary repairs will not involve any procedures that are uncommon in the art.

GENERAL MODE OF CONDUCTING PROCESS

As a continuously operating laboratory reactor, an 800 mm high cylindrical quartz tube was used, having a diameter of 50 mm, corresponding to a cross sectional area of 19.65 cm². The blast tray was horizontal and had a centrally disposed gas admission aperture of approximately 3 mm diameter. Underneath it, there was a second tray to prevent solids from dropping out upon shutdown, into which the gas was admitted through peripherally disposed holes. Adjacent the blast tray there was a slightly tilted connection of 8 mm diameter which served to let out the fluidized bed and which was closed with a cover during the operation of the reactor.

The reactor did not contain a separate cooling system. To compensate for lost heat and for temperature control it was provided with a removable, electrical, controlled jacket heater (3 zones of 1 kW each). Temperature measurement was performed by three temperature sensors disposed at various levels in the fluid bed.

The hydrogen chloride was fed to the blast tray through a flow meter. The operating pressure of the fluid bed was checked by means of a pressure gauge in the feed line. The raw product gas emerging from the fluid bed was carried at a temperature of about 200° C through a receiver having a capacity of approximately 6 liters superimposed on the reactor, and any solid particles that may have been entrained fell back from this receiver into the fluid bed. The gas was carried from the receiver through a cyclone heated to approximately 80° C, in which sublimed solid impurities, such as $AlCl_3$ for example, were partially separated. Then all of the chlorosilanes were completely condensed by washing with hexachlorodisiloxane and fed to the distillation. The exhaust gas, consisting of hydrogen, was measured by means of a thermal conductivity detector and then burned in a pilot flame.

The partially continuous charging with fresh silicon and with iron compounds was performed from a hopper through a tube descending through the receiver into the fluid bed. The proportioning was controlled on the basis of the depth of the fluid bed by means of a detector which responded to the temperature at the top of the fluid bed. As the fluid bed level dropped, the temperature dropped at the location of the detector and the feeding of silicon was initiated. Conversely, it was stopped when the temperature rose due to reimmersion of the detector.

Now that the problem of temperature control in the reaction center has been solved by the method of the invention, the hydrochlorination of elemental silicon can be carried out in a controlled reaction to form trichlorosilane in virtually any desired quantity relative to tetrachlorosilane.

In order to more fully illustrate the invention and the manner of practicing the same, the following examples are presented. These examples are intended to illustrate the invention and are not intended to restrict the same.

EXAMPLE 1

410 g of elemental silicon (more than 99% Si, less than 1% Fe + Al, traces of Ti, etc.) having the following grain size distribution:
 under 0.04 mm = 4%
 0.04 to 0.2 mm = 33%
 0.2 to 0.4 mm = 34%
 0.4 to 0.6 mm = 24%
 0.6 to 1.0 mm = 3%
 1.0 to 2.0 mm = 2%
were thoroughly mixed with 228 g of finely ground, dry, anhydrous iron(II) chloride and charged in the form of a fluid bed in a reactor such as described above. The layer when at rest had a depth of 320 mm.

The apparatus was preheated to 440° C and started up with 220 Nl/h of hydrogen chloride (corresponding to a blast velocity of 3.2 cm/sec with respect to the empty reactor), thereby expanding the layer to a depth of about 380 mm, the layer assuming a uniform temperature of 478° C as a result of the hydrochlorination reaction. This temperature was maintained for about 70 hours within approximately ± 5° C. During this period fresh silicon was constantly fed in (total 5095g) and the raw product that formed was collected by condensation and washed with hexachlorodisiloxane at −30° C.

Distillative separation of the hexachlorodisiloxane, which was recycled into the process, yielded a raw product (total 29,384 g) consisting of trichlorosilane and tetrachlorosilane which, according to gas chromatographic analysis and volumetric determination of the active hydrogen, contained approximately 14% trichlorosilane.

Column distillation of the raw product yielded 4,341 g of trichlorosilane and 24,790 g of tetrachlorosilane. With respect to the hydrogen chloride imput, this corresponded to a yield of approximately 96%; with respect to the technical pure silicon input it corresponded to a yield of about 97%. 121 g of aluminum chloride was separated in the cyclone as by-product. The fluid bed contained iron in a concentration of 19.4% at the end of the operating period.

EXAMPLE 2

The experiment of Example 1 was interrupted after about 70 hours. The temperature in the fluid bed was then adjusted to 290° C and the operation of the apparatus was continued while a uniform temperature of 304° C established itself in the fluid bed due to self-heating. This temperature was then maintained, again over a period of about 70 hours.

The raw product that formed, in a total of 30,720 g, contained approximately 88% trichlorosilane according to gas chromatographic analysis and gas volumetric determination of the active hydrogen.

Column distillation of the raw product yielded 27,163 g of trichlorosilane and 3,176 g of tetrachlorosilane. With respect to hydrogen chloride, the yield was accordingly approximately 97%; with respect to silicon it was about 98%. 136 g of aluminum chloride was obtained as a by-product.

Towards the end of the operating period the fluid bed contained iron in a concentration of 23.8%.

EXAMPLES 3 to 6

Four additional operations were conducted similarly to Example 2, for periods of about 70 hours of operation each, at various temperature levels, and the percentages of trichlorosilane and tetrachlorosilane thus achieved were measured by gas chromatography and gas volumetric analysis, as well as by weighing after column distillation. After each operating period the resultant iron content in the fluid bed was measured. The results are summed by in Table 1.

TABLE 1

Rate of formation of trichlorosilane and tetrachlorosilane in the hydrochlorination of elemental silicon in relation to the reaction temperature in the presence of 16 to 36% chemically bound iron in the fluid bed in accordance with the invention:

| Example No. | Temperature of the reaction | Yields in % Trichloro-silane | Tetrachloro-silane | Fe content in the layer at end of experiment |
|---|---|---|---|---|
| 1 | 478° C | 14% | 86% | 19.4% |
| 2 | 304° C | 88% | 12% | 22.8% |
| 3 | 331° C | 80% | 20% | 25.6 |
| 4 | 359° C | 67% | 33% | 28.4% |
| 5 | 380° C | 49% | 51% | 31.7% |
| 6 | 426° C | 26% | 74% | 34.5% |

EXAMPLE 7

Of the fluid bed that was in operation for more than about 420 hours in Examples 1 to 6, approximately 50% of its volume (about 440 g), with an iron content of about 34.5% (residual silicon about 22%), was let out and regenerated in the manner described further below.

The fluid bed was replenished with about 250 g of a ferrosilicon (approximately 92% Si, approximately 7% Fe, approximately 1% Al, traces of Ti, etc.) having the following grain size distribution:

Less than 0.04 mm = 7%
0.04 to 0.2 mm = 26%
0.2 to 0.4 mm = 38%
0.4 to 0.6 mm = 22%
0.6 to 1.0 mm = 5%
1.0 to 2.0 mm = 2%

The reactor was preheated to about 300° C and was fed approximately 250 Nl/h of hydrogen chloride (corresponding to a blast velocity of 3.6 cm/sec with respect to the empty reactor), a working temperature of about 325° C establishing itself, which was maintained constant.

Approximately 460 g of raw product was isolated per hour, which consisted of about 83% trichlorosilane and about 17% tetrachlorosilane according to gas chromatographic analysis and gas volumetric determinations. Column distillation yielded the same values. With respect to hydrogen chloride, the yield accordingly amounted to about 93.8%. Since approximately 100 g/h of ferrosilicon of the above-described composition and grain size was fed in, the yield with respect to silicon was about 96%. In addition, about 5 g of aluminum chloride per hour was separated.

During about 8 hours of continuous operation the iron content in the fluid bed increased from about 24% initially to about 31%. Consequently, after every eight hours of operation approximately 350 ml of the fluid bed was let out and replaced with about 350 ml of fresh ferrosilicon. The fluid bed material let out contained, in addition to $FeCl_2$, a percentage of elemental silicon of the order of 20 to 40%, which was recovered by removing the $FeCl_2$ by sublimation in a slow current of hydrogen gas at about 600° C.

The elemental silicon that remained thereafter had a fine granular structure. It was virtually free of foreign substances, and it was mixed in amounts of up to 12% with fresh silicon and recycled into the reaction without producing changes in the operation of the process.

What is claimed is:

1. In a process for preparing a mixture of $SiCl_4$ and $SiHCl_3$ wherein elemental silicon is contacted with HCl in a fluidized bed, the improvement which comprises carrying out the process in the presence of an iron compound, which iron compound is present in an amount such that when calculated as iron the iron content is 10 to 43 weight percent based on the weight of the total solids in the fluidized bed, at a temperature in the range of 260° to 600° C.

2. In a process for preparing $SiCl_4$ and $SiHCL_3$ wherein elemental silicon is contacted with HCl in a fluidized bed, the improvement which comprises carrying out the process in the presence of an iron compound, which iron compound is present in an amount such that when calculated as iron the iron content is 10 to 43 iron percent based on the weight of the total solids in the fluidized bed, at a temperature in the range of 260° to 600° C.

3. A process according to claim 2 without adding an inert gas.

4. A process according to claim 3 wherein the iron compound is iron(II) chloride.

5. A process according to claim 3 wherein the iron compound is a ferrosilicon compound.

6. A process according to claim 3 carried out at a temperature of 260°–400° C.

7. A process according to claim 3 carried out at a temperature of about 400° up to 600° C.

8. A process according to claim 3 wherein the iron compound is present in an amount, such that when calculated as iron, the iron is present in an amount of 16 to 36%., based on the total weight of the solids in the fluidized bed.

9. A process according to claim 3 wherein the hydrogen chloride is introduced into the bottom of a fluid bed reactor and a flow velocity of 1 to 8 cm/sec is maintained in said reactor.

* * * * *

UNITED STATES PATENT AND TRADEMARK OFFICE
CERTIFICATE OF CORRECTION

PATENT NO. : 4,044,109
DATED : August 23, 1977
INVENTOR(S) : Han-Joachim Kötzsch et al It is certified that error appears in the above—identified patent and that said Letters Patent are hereby corrected as shown below:

Column 1, line 25, "NC1" should read -- HCl --.
Column 5, line 11, "qualtities" should read -- qualities --
Column 5, line 60, "19.65" should read -- 19.5 --.
Column 7, line 50, "by" should read -- up --.

Signed and Sealed this

Thirteenth Day of June 1978

[SEAL]

Attest:

RUTH C. MASON
Attesting Officer

DONALD W. BANNER
Commissioner of Patents and Trademarks